United States Patent [19]

Amimoto et al.

[11] Patent Number: 4,795,793
[45] Date of Patent: Jan. 3, 1989

[54] FLUORINE-CONTAINING COPOLYMER AND OIL AND WATER REPELLENT COMPOSITION CONTAINING THE SAME

[75] Inventors: Yoshio Amimoto, Takatsuki; Masayoshi Shinjo, Settsu; Kazunori Hayashi, Settsu; Takashi Enomoto, Settsu, all of Japan

[73] Assignee: Daikin Industries Ltd., Osaka, Japan

[21] Appl. No.: 127,367

[22] Filed: Dec. 2, 1987

[30] Foreign Application Priority Data

Dec. 5, 1986 [JP] Japan .................. 61-290783

[51] Int. Cl.$^4$ .................. C08F 12/30; C08J 3/02; C08K 3/20
[52] U.S. Cl. .................. 526/243; 526/245; 526/246; 524/501; 524/520; 524/805; 525/200; 525/276
[58] Field of Search .................. 526/243, 245, 246; 524/501, 520, 805; 525/200, 276

[56] References Cited

U.S. PATENT DOCUMENTS

| | | | |
|---|---|---|---|
| 3,822,228 | 7/1974 | Petrella et al. | 526/243 |
| 3,901,864 | 8/1975 | Jager | 526/246 |
| 4,032,495 | 6/1977 | Perronin et al. | 428/421 |
| 4,075,237 | 2/1978 | Kleiner et al. | 526/286 |
| 4,080,507 | 3/1978 | Gresham | 560/223 |
| 4,171,415 | 10/1979 | Kleiner et al. | 427/393.4 |
| 4,584,143 | 4/1986 | Falk | 526/243 |
| 4,595,518 | 6/1986 | Raynolds et al. | 427/393.4 |
| 4,612,356 | 9/1986 | Falk | 526/243 |

*Primary Examiner*—Joseph L. Schofer
*Assistant Examiner*—N. Sarofim
*Attorney, Agent, or Firm*—Armstrong, Nikaido, Marmelstein & Kubovcik

[57] ABSTRACT

A copolymer comprising 50 to 90% by weight of the constituting unit derived from (a) a polymerizable compound having a perfluoroalkyl group of 4 to 20 carbon atoms, 10 to 50% by weight of the constituting unit derived from (b) cyclohexyl or benzyl ester of acrylic acid or methacrylic acid and 0.1 to 10% by weight of the constituting unit derived from (c) at least one selected from the group consisting of polyethylene glycol diacrylate of the formula

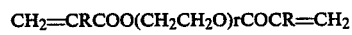

$$CH_2=CRCOO(CH_2CH_2O)rCOCR=CH_2$$

wherein R is hydrogen atom or methyl, r is an integer of 1 to 50, and N-methylolacrylamide. The copolymer is useful as an oil and water repellent composition.

6 Claims, No Drawings

FLUORINE-CONTAINING COPOLYMER AND OIL AND WATER REPELLENT COMPOSITION CONTAINING THE SAME

The present invention relates to a fluorine-containing copolymer having solubility in organic solvents, which can afford an oil and water repellent composition, and to an oil and water repellent composition containing the copolymer.

Conventionally, an oil and water repellent composition was known which comprises a polymer of a compound having perfluoroalkyl group. Oil and water repellent compositions are classified, for example, into a latex type in which the copolymer is emulsified in an aqueous medium with use of a surfactant, solution type in which the copolymer is dissolved in an organic solvent, aerosol type, etc. In order to use the composition in commercially wide fields or to afford various other properties, it is proposed to copolymerize the compound having perfluoroalkyl group with alkyl acrylate, maleic anhydride, chloroprene, butadiene, methyl vinyl ketone, styrene or like other polymerizable compound. For example, it is known that the compound having perfluoroalkyl group is copolymerized with methyl acrylate, butyl methacrylate or the like to render the resulting copolymer soluble in an organic solvent to prepare a solution type oil and water repellent composition.

Although the copolymer obtained by the copolymerization of the compound having perfluoroalkyl group with methyl acrylate or butyl methacrylate has an improved solubility in an organic solvent, the copolymer has a defect of being lowered in oil and water repellency, particularly in water repellency. Further, vinyl acetate, vinyl chloride or the like does not lower water repellency of the resulting copolymer, but they render the copolymer insoluble in an organic solvent.

In view of the above problems, a copolymer of a compound having perfluoroalkyl group and benzyl acrylate or methacrylate was disclosed in Japanese examined patent publication No. 3759/1978, and the copolymer has solubility in an organic solvent without being lowered in water repellecy.

With a trend toward increasing needs for high and varied quality in oil and water repellent compositions, it is required to further improve properties thereof, but the oil and water repellent composition containing the above copolymer has a problem of being inferior, particularly in oil and water repellency after dry-cleaning.

An object of the present invention is to provide an oil and water repellent composition which has excellent solubility in an organic solvent, is extremely improved in oil and water repellency and in lasting of the repellency, and further has excellent durability to dry-cleaning, and to provide a fluorine-containing copolymer constituting the composition.

The above and other objects of the invention will become apparent from the following description.

The present invention provides a copolymer comprising 50 to 90% by weight of the constituting unit derived from (a) a polymerizable compound having a perfluoroalkyl group of 4 to 20 carbon atoms, 10 to 50% by weight of the constituting unit derived from (b) cyclohexyl or benzyl ester of acrylic acid or methacrylic acid and 0.1 to 10% by weight of the constituting unit derived from (c) at least one selected from the group consisting of polyethylene glycol diacrylate of the formula $$CH_2=CRCOO(CH_2CH_2O)_rCOCR=CH_2$$

wherein R is hydrogen atom or methyl, r is an integer of 1 to 50, and N-methylolacrylamide.

The compound having a perfluoroalkyl group of 4 to 20 carbon atoms of the present invention (hereinafter referred to as "(a) monomer") includes the following acrylates and methacrylates, $$RfSO_2NR^2OCOCR^3=CH_2 \qquad (1)$$
$$\overset{R^1}{|}$$

$$Rf(CH_2)_nOCOCR^3=CH_2 \qquad (2)$$

$$RfCONR^2OCOCR^3=CH_2 \qquad (3)$$
$$\overset{R^1}{|}$$

$$RfCH_2CHCH_2OCOCR^3=CH_2 \qquad (4)$$
$$\overset{OH}{|}$$

$$RfCH_2CHCH_2OCOCR^3=CH_2 \qquad (5)$$
$$\overset{OCOR^4}{|}$$

$$Rf(CH_2)_mCOOCH=CH_2 \qquad (6)$$
$$RfCH=CH(CH_2)_nOCOCR^3=CH_2 \qquad (7)$$

In the above, Rf is perfluoroalkyl group of 4 to 20 carbon atoms, $R^1$ is hydrogen atom or alkyl group of 1 to 10 carbon atoms, $R^2$ is alkylene group of 1 to 10 carbon atoms, $R^3$ is hydrogen atom or methyl group, $R^4$ is alkyl group of 1 to 17 carbon atoms, n is 1 to 10, m is 0 to 10.

The amount of (a) monomer is 50 to 90% by weight. Amounts less than 50% render the copolymer lower oil and water repellency.

The content of cyclohexyl or benzyl ester of acrylic acid or methacrylic acid of the present invention (hereinafter referred to as "(b) monomer") is 10 to 50% by weight. Amounts less than 10% render the copolymer less soluble in an organic solvent. Amounts more than 50% render oil and water repellency of the copolymer lower.

Among polyethylene glycol diacrylate of the formula $$CH_2=CRCOO(CH_2CH_2O)_rCOCR=CH_2$$

wherein R is hydrogen atom, or methyl, r is an integer of 1 to 50 (hereinafter referred to as "(c_1) monomer"), preferable are those having r of 14 to 23. Further, in the present invention, sometimes is used N-methylolacrylamide (hereinafter referred to as "(c_2) monomer"). In the present invention is used at least one selected from the group consisting of the above (c_1) monomer and (c_2) monomer. In case of using the both of (c_1) monomer and (c_2) monomer, the resulting oil and water repellent composition has extremely excellent durability to dry-cleaning, hence preferable. In the invention, at least one selected from the group consisting of (c_1) monomer and (c_2) monomer is referred to as (c) monomer.

In the present invention, the copolymer comprises optionally as a constituting unit thereof, at least one of various copolymerizable compounds such as ethylene, vinyl acetate, vinyl fluoride, vinyl chloride, acrylic acid amide, methacrylic acid amide, styrene, α-methylstyrene, p-methylstyrene, alkyl($C_{1 \sim 20}$) ester of acrylic acid or methacrylic acid, benzyl acrylate or methacrylate, vinyl alkyl($C_{1 \sim 20}$) ether, halogenated alkyl ($C_{1 \sim 20}$) vinyl ether, vinyl alkyl($C_{1 \sim 20}$) ketone, maleic anhydride, butadiene, isoprene, chloroprene.

In the present invention is prepared a copolymer comprising 50 to 90% (% by weight, the same as hereinafter) of the constituting unit derived from (a) monomer, 10 to 50% of the one derived from (b) monomer, 0.1 to 10% of the one derived from (c) monomer which is at least one selected from the group consisting of ($c_1$) monomer and ($c_2$) monomer and the copolymer is used as an oil and water repellent composition.

The copolymer can be prepared by copolymerizing these monomers according to a known method such as bulk polymerization, solution polymerization, suspension polymerization, emulsion polymerization, radiation polymerization, photopolymerization or the like. For example, for solution polymerization, the monomers to be polymerized are dissolved in an organic solvent and copolymerized with stirring. Examples of polymerization initiators are organic peroxides, azo compounds, persulfates, or γ-ray and like ionized radiation. For emulsion polymerization are used as a surfactant almost all of emulsifiers which are any of anionic, cationic or nonionic one. In the present invention, the copolymer may be prepared opptionally by copolymerizing the above-mentioned monomer such as ethylene, vinyl acetate or the like. By selecting and copolymerizing the above polymerizable compound with the present monomers, it is possible to improve the characteristics such as soil release property, wear resistance, selective solubility, flexibility, touch-softness or the like in addition to oil and water repellency and durability.

The copolymer of the present invention has molecular weight of preferably 10,000 to 60,000.

The oil and water repellent composition comprising the present copolymer can be formulated into an aerosol composition according to a usual manner. For example, it is possible to prepare an aerosol concentrate containing 10 to 40 wt.% of the present copolymer which is directly obtained by solution polymerization. Further, the copolymer obtained by emulsion polymerization, suspension polymerization, bulk polymerization or like other polymerization methods is separated from the medium or the like and is dissolved in a solvent to obtain a solution.

Preferred examples of solvents used for polymerization or trichlorotrifluoroethane, difluoroethane and like fluorine-containing solvent, acetone, methylchloroform, trichloroethylene, tetrachloroethylene. These solvents can be used singly or in mixture of at least two of them. Aerosol formulation can be prepared by dissolving the copolymer in the above solvent into a solution at a concentration of 0.2 to 5 wt.% of the copolymer, adding thereto dichlorofluoromethane, monofluorotrichloromethane, dichlorotetrafluoroethane or like propellent and filling the mixture in an appropriate container. Generally, 40 to 80 parts of the solution and 60 to 20 parts of the propellent are mixed.

Further, the oil and water repellent composition of the present invention may be mixed with an other polymer, or with other additives such as other water repellent composition, oil repellent composition, insecticide, flame retarder, antistatic agent, dye fixing agent, flavor or the like.

Articles which can be treated with the oil and water repellent composition of this invention are not limited, and can be fibrous fabrics, glass, paper, wood, leather, wool, asbestos, brick, cement, metal, metal oxides, ceramics, plastics, coating surfaces and plaster. Particularly preferable are fiber or fibrous fabric made of polyester, cotton, polyamide, acrylic polymer, silk, wool, and mixtures thereof.

The present invention will be explained in more detail by showing examples and comparison examples which are not intended to limit the scope of the present invention. In the following, water repellency and oil repellency are measured by the methods below. Water repellency is measured by JIS L-1092 spray method and is evaluated by water repellency rating shown in Table 1. Oil repellency is measured by placing a drop of test solution on the article, observing whether any penetration into the article is noted visually after three minutes, and is evaluated by oil repellency rating given in Table 2.

TABLE 1

| Water repellency rating | Condition |
|---|---|
| 100 | No wetting of the surface |
| 90 | Small wetting of the surface |
| 80 | Visible wetting of the surface |
| 70 | Partial wetting of the surface |
| 50 | Full wetting of the surface |
| 0 | Complete wetting of both surfaces |

TABLE 2

| Oil repellency rating | Test solution |
|---|---|
| 7 | n-Octane |
| 6 | n-Decane |
| 5 | n-Dodecane |
| 4 | n-Tetradecane |
| 3 | n-Hexadecane |
| 2 | 35–65 Hexadecane-Nujol |
| 1 | Nujol |
| 0 | Penetration by Nujol |

In the water repellency rating, the "+" symbol next to some numbers indicates a number slightly higher than the base numbers.

Dry-cleaning test was conducted with use of a Launder-o-meter by treating the article with tetrachloroethylene at 30° C. for 30 minutes and drying at room temperature, and dry-cleaning property was evaluated by water repellency rating according to JIS L-1092.

Shower test was conducted according to JIS L-1092 by showering the article continuously with water and the result is evaluated by water repellency rating after prescribed period.

EXAMPLES 1 TO 13 AND COMPARISON EXAMPLES 1 to 7

Five or less kinds of the monomers listed in Table 3 were placed into a 100-cc flask in a prescribed amount (total in 20 g). Thereto were added 46 g of trichlorotrifluoroethane, 46 g of tetrachloroethylene, 3 g of tert-butyl alcohol and 3 g of acetone. The flask was provided with a thermometer, nitrogen purge tube, stirrer and condenser and the mixture was copolymerized with addition of 0.3 g of Perbutyl PV (catalyst, a product of Nippon Oil & Fats Co., Ltd.) at 60° C. for 12 hours with stirring while purging with nitrogen. The resulting copolymer solution was diluted with tetrachloroethylene to obtain a 0.2 wt.% solution of the copolymer.

A polyester fabric (tropical) was dipped in the above diluted solution, squeezed by a mangle and dried at room temperature for 24 hours. Table 3 shows oil and water repellency and dry-cleaning property of the treated fabric. The copolymer obtained in Example 1 had melting point of 65° C. and molecular weight (vapor pressure equilibrium method, solvent: metaxylene hexafluoride) of 40,000.

TABLE 3

| | composition | (weight ratio) | WR | OR | DC |
|---|---|---|---|---|---|
| Ex. 1 | FA/CHMA/NK23G/NMAM/* | 70/23/1/1/5 | 100+ | 7 | 100+ |
| 2 | FA/CHMA/NK23G/NMAM | 50/48/1/1 | 90 | 5 | 90 |
| 3 | FA/CHMA/NKA600/NMAM | 70/28/1/1 | 100+ | 7 | 100 |
| 4 | FA/CHA/NK23G/NMAM | 70/28/1/1 | 100+ | 4 | 100 |
| 5 | FA/CHA/NKA600/NMAM | 70/28/1/1 | 90 | 5 | 90 |
| 6 | FMA/CHMA/NK23G/NMAM | 70/28/1/1 | 100+ | 7 | 100+ |
| 7 | FMA/CHMA/NK23G/NMAM | 50/48/1/1 | 100+ | 6 | 90 |
| 8 | FMA/CHMA/NKA600/NMAM | 70/28/1/1 | 100+ | 7 | 100+ |
| 9 | FMA/CHA/NK23G/NMAM | 70/28/1/1 | 100+ | 6 | 100 |
| 10 | FMA/CHA/NKA600/NMAM | 70/28/1/1 | 100 | 6 | 90 |
| 11 | FA/CHMA/NK23G | 70/29/1 | 100 | 7 | 70 |
| 12 | FA/CHMA/NKA600 | 70/29/1 | 100 | 7 | 70 |
| 13 | FMA/BenMA/NK23G | 70/29/1 | 100 | 6 | 80 |
| Com. Ex. 1 | FA/MMA | 70/30 | 70 | 5 | 0 |
| 2 | FA/MA | 70/30 | 50 | 5 | 0 |
| 3 | FA/n-BMA | 70/30 | 50 | 6 | 0 |
| 4 | FA/CHMA | 70/30 | 80 | 5 | 50 |
| 5 | FA/CHA | 70/30 | 80 | 5 | 50 |
| 6 | FA/BenMA | 70/30 | 80+ | 5 | 50 |
| 7 | FA/StA | 70/30 | 100+ | 6 | 50 |

In Table 3,
FA: $CH_2\!=\!CHCOOCH_2CH_2C_8F_{17}$
FMA: $CH_2\!=\!C(CH_3)COOCH_2CH_2C_8F_{17}$
NK23G: NK ester 23G produced by Shin-Nakamura Chemical Co., Ltd. and represented by the formula
$CH_2\!=\!C(CH_3)COO(CH_2CH_2O)_{23}COC(CH_3)\!=\!CH_2$
NKA600: NK ester A600 produced by Shin-Nakamura Chemical Co., Ltd. and represented by the formula
$CH_2\!=\!CHCOO(CH_2CH_2O)_{13}COCH\!=\!CH_2$
NMAM: $CH_2\!=\!CHCONHCH_2OH$
MA: $CH_2\!=\!CHCOOCH_3$
MMA: $CH_2\!=\!C(CH_3)COOCH_3$
n-BMA: $CH_2\!=\!C(CH_3)COOCH_2CH_2CH_2CH_3$ CHA: 

CHMA: 

BenA: $CH_2\!=\!CHCOOCH_2C_6H_5$
BenMA: $CH_2\!=\!C(CH_3)COOCH_2C_6H_5$
StA: $CH_2\!=\!CHCOOC_{18}H_{37}$
*: Lauryl methacrylate
WR: Water repellency
OR: Oil repellency
DC: Dry-cleaning property

EXAMPLES 14 TO 17 AND COMPARISON EXAMPLES 8 TO 9

Copolymers having a composition listed in Table 4 were prepared in the same manner as in Example 1 and diluted with tetrachloroethylene to obtain a 0.2 wt.% solution of the copolymer. A polyester fabric (tropical) was treated in the same manner as in Example 1 and shower test was conducted. The results were given in Table 4.

EXAMPLES 18 TO 24 AND COMPARISON EXAMPLES 10 TO 12

Five or less kinds of the monomers listed in Table 5 were placed into a 100-cc flask in a prescribed amount (total in 20 g). Thereto were added 4 g of ethylene glycol, 16 g of acetone, 40 g of water, 3 g of nonionic emulsifier (Nonion HS 220, a product of Nippon Oil & Fats Co., Ltd.) and 3 g of cationic emulsifier (Cation AB, a product of Nippon Oil & Fats Co., Ltd.). The flask was provided with a thermometer, nitrogen purge tube, stirrer and condenser and the mixture was copolymerized with addition of 0.2 g of V-50 (catalyst, hydrochloride of azobisisobutyronitrile) at 60° C. for 3 hours with stirring while purging with nitrogen. The resulting copolymer latex was diluted with water to obtain a 0.2 wt.% solution of the copolymer.

A polyester fabric (tropical) was dipped in the above diluted solution, squeezed by a mangle and treated at

TABLE 4

| | composition | Shower test (min.) | | | |
|---|---|---|---|---|---|
| | (weight ratio) | 0 | 20 | 30 | 40 |
| Ex. 14 | FA/CHMA/NK23G/NMAM/*70/23/1/1/5 | 100+ | 90+ | 80+ | 80+ |
| 15 | FA/CHA/NKA600/NMAM 70/28/1/1 | 100+ | 80+ | 80 | 80 |
| 16 | FMA/CHMA/NK23G/NMAM 70/28/1/1 | 100+ | 90+ | 90 | 80 |
| 17 | FA/CHMA/NK23G 70/29/1 | 100 | 80+ | 70 | 50+ |
| Com. Ex. 8 | FA/CHMA 70/30 | 80 | 80 | 50 | 0 |
| 9 | FA/BenMA 70/30 | 80+ | 80+ | 70 | 0 |

*Lauryl methacrylate

120° C. for 3 minutes. Table 5 shows oil and water repellency and dry-cleaning property of the treated fabric.

TABLE 5

|  | composition (weight ratio) | WR | OR | DC |
|---|---|---|---|---|
| Ex. 18 | FA/CHMA/NK23G/NMAM/* 70/23/1/1/5 | 100+ | 7 | 90+ |
| 19 | FA/CHMA/NKA600/NMAM 70/28/1/1 | 100+ | 7 | 90 |
| 20 | FA/CHA/NK23G/NMAM 70/28/1/1 | 100+ | 7 | 90 |
| 21 | FMA/CHMA/NK23G/NMAM 70/28/1/1 | 100+ | 7 | 90 |
| 22 | FA/CHMA/NK23G 70/29/1 | 100+ | 7 | 70 |
| 23 | FMA/BenMA/NK23G 70/29/1 | 100+ | 7 | 70 |
| 24 | FA/BenMA/NK23G/NMAM 70/28/1/1 | 100+ | 7 | 70+ |
| Com. Ex. 10 | FA/n-BMA 70/30 | 100 | 7 | 0 |
| 11 | FA/CHMA 70/30 | 100+ | 6 | 50 |
| 12 | FA/BenMA 70/30 | 100+ | 6 | 50 |

*Lauryl methacrylate

We claim:

1. A copolymer comprising 50 to 90% by weight of the constituting unit derived from (a) a polymerizable compound having a perfluoroalkyl group of 4 to 20 carbon atoms, 10 to 50% by weight of the constituting unit derived from (b) cyclohexyl or benzyl ester of acrylic acid or methacrylic acid and 0.1 to 10% by weight of the constituting unit derived from (c) at least one selected from the group consisting of polyethylene glycol diacrylate of the formula $$CH_2=CRCOO(CH_2CH_2O)_rCOCR=CH_2$$

where R is hydrogen atom or methyl, r is an integer of 1 to 50, and N-methylolacrylamide.

2. A copolymer as defined in claim 1 wherein the polymerizable compound (a) having a perfluoroalkyl group is at least one compound selected from the group consisting of the following compounds;

$$RfSO_2NR^2OCOCR^3=CH_2 \quad (1)$$

$$Rf(CH_2)_nOCOCR^3=CH_2 \quad (2)$$

$$RfCONR^2OCOCR^3=CH_2 \quad (3)$$

$$RfCH_2\overset{OH}{\underset{|}{C}}HCH_2OCOCR^3=CH_2 \quad (4)$$

$$RfCH_2\overset{OCOR^4}{\underset{|}{C}}HCH_2OCOCR^3=CH_2 \quad (5)$$

$$Rf(CH_2)_mCOOCH=CH_2 \quad (6)$$

$$RfCH=CH(CH_2)_nOCOCR^3=CH_2 \quad (7)$$

wherein Rf is perfluoroalkyl group of 4 to 20 carbon atoms, $R^1$ is hydrogen atom or alkyl group of 1 to 10 carbon atoms, $R^2$ is alkylene grup of 1 to 10 carbon atoms, $R^3$ is hydrogen atom or methyl group, $R^4$ is alkyl group of 1 to 17 carbon atoms, n is 1 to 10, m is 0 to 10.

3. An oil and water repellent composition which contains a copolymer of claim 1.

4. An oil and water repellent composition which contains a copolymer of claim 2.

5. An oil and water repellent composition as defined in claim 3 which further contains an organic solvent.

6. An oil and water repellent composition as defined in claim 3 which further contains a propellent.

* * * * *